United States Patent
Yamasaki

(10) Patent No.: US 9,912,208 B2
(45) Date of Patent: Mar. 6, 2018

(54) DRIVE APPARATUS

(71) Applicant: DENSO CORPORATION, Kariya, Aichi-pref. (JP)

(72) Inventor: Masashi Yamasaki, Obu (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 337 days.

(21) Appl. No.: 14/861,801

(22) Filed: Sep. 22, 2015

(65) Prior Publication Data

US 2016/0094106 A1  Mar. 31, 2016

(30) Foreign Application Priority Data

Sep. 26, 2014  (JP) .................................. 2014-196642

(51) Int. Cl.
  *H02K 5/22*  (2006.01)
  *H02K 3/28*  (2006.01)
  *H01R 12/57*  (2011.01)
  *H02K 11/30*  (2016.01)

(52) U.S. Cl.
  CPC ............. *H02K 5/225* (2013.01); *H01R 12/57* (2013.01); *H02K 3/28* (2013.01); *H02K 11/30* (2016.01)

(58) Field of Classification Search
  CPC ....................................................... H02K 5/225
  See application file for complete search history.

(56) References Cited

U.S. PATENT DOCUMENTS

| 4,420,210 A * | 12/1983 | Karol .................. H01R 13/521 |
| | | 174/152 GM |
| 6,368,130 B1 * | 4/2002 | Fukuda .................. H01R 13/52 |
| | | 439/271 |
| 6,380,648 B1 * | 4/2002 | Hsu .......................... H02K 3/28 |
| | | 310/67 A |
| 6,524,117 B1 | 2/2003 | Murakami et al. |
| 6,984,134 B1 * | 1/2006 | Eakins ................. H01R 13/113 |
| | | 439/78 |

(Continued)

FOREIGN PATENT DOCUMENTS

| JP | H03-80985 | 12/1991 |
| JP | H8-330792 A | 12/1996 |
| JP | 2013-196974 | 9/2013 |

OTHER PUBLICATIONS

U.S. Appl. No. 14/861,830, filed Sep. 22, 2015, Yamasaki, Masashi.

*Primary Examiner* — Robert W Horn
(74) *Attorney, Agent, or Firm* — Knobbe, Martens, Olson & Bear, LLP

(57) ABSTRACT

A drive apparatus includes a controller, which has a circuit board and a plurality of connection terminals, and an electric motor, which includes a plurality of winding sets and a plurality of motor lines. Each of the winding sets includes a plurality of windings. Each motor lines has an insertion length that is a length of the motor line measured from a contact start part of the motor line, which first contacts a corresponding one of the connection terminals at a time of press fitting the motor line into the corresponding connection terminal, to a contacting part of the motor line, which is in contact with the corresponding connection terminal after the press fitting of the motor line into the corresponding connection terminal. The insertion lengths of the motor lines are grouped into at least two groups.

5 Claims, 6 Drawing Sheets

(56) References Cited

U.S. PATENT DOCUMENTS

| | | | | |
|---|---|---|---|---|
| 7,687,715 B2* | 3/2010 | Sano | ................... | H05K 3/368 174/88 R |
| 8,436,500 B2* | 5/2013 | Minato | ................ | H02M 7/003 310/68 C |
| 8,829,746 B2* | 9/2014 | Yamasaki | ............ | B62D 5/0406 310/110 |
| 9,356,379 B2* | 5/2016 | Jocham | ............. | H01R 13/4361 |
| 9,359,004 B2* | 6/2016 | Kawata | ................ | B62D 5/0412 |
| 9,444,311 B2* | 9/2016 | Ito | ......................... | H02K 5/225 |
| 2010/0133935 A1* | 6/2010 | Kinugawa | ............ | H02K 3/50 310/89 |
| 2010/0289354 A1* | 11/2010 | Ishizue | ................... | H02K 5/08 310/71 |
| 2011/0034073 A1* | 2/2011 | Umfahrer | ............ | H01R 13/405 439/587 |
| 2012/0068570 A1* | 3/2012 | Chamberlin | ............. | H02K 3/28 310/198 |
| 2012/0091839 A1* | 4/2012 | Hein | ...................... | H02K 5/225 310/71 |
| 2012/0098361 A1 | 4/2012 | Yamasaki et al. | | |
| 2012/0313460 A1* | 12/2012 | Schaflein | ............... | H02K 5/225 310/43 |
| 2014/0111044 A1* | 4/2014 | Baumann | ........... | H01R 13/5208 310/71 |
| 2014/0125173 A1* | 5/2014 | Hayashi | ................. | H02K 3/522 310/88 |
| 2014/0154933 A1* | 6/2014 | Miura | .................... | H02K 3/522 439/882 |
| 2015/0194857 A1* | 7/2015 | Hernandez | ............. | H02K 5/225 310/71 |
| 2016/0036306 A1* | 2/2016 | Yamasaki | .............. | H02K 5/225 310/71 |
| 2016/0094106 A1* | 3/2016 | Yamasaki | .............. | H01R 12/57 310/71 |
| 2016/0297470 A1* | 10/2016 | Yamasaki | ............ | B62D 5/0403 |
| 2016/0347354 A1* | 12/2016 | Asao | .................... | B62D 5/0406 |

* cited by examiner

INSERTION DIRECTION

DRIVE APPARATUS

CROSS REFERENCE TO RELATED APPLICATION

This application is based on and incorporates herein by reference Japanese Patent Application No. 2014-196642 filed on Sep. 26, 2014.

TECHNICAL FIELD

The present disclosure relates to a drive apparatus that includes an electric motor and a controller, which supplies an electric power to the electric motor.

BACKGROUND

A press fit connection technology, which does not involve soldering, is known as a method of connecting a terminal to a circuit board. A press fit connection is made by press fitting a male terminal into a female terminal provided to the circuit board. Furthermore, a connection state between the male terminals and the female terminals is checked to determine whether the male terminals are connected to the female terminals in a normal way by measuring an insertion load, which is required to press fit the male terminals into the female terminals (see, for example, JP H08-330792A).

However, in a case where the male terminals are press fitted into the female terminals at once, a variation in the required insertion load, which is required to press fit each of the male terminals into the corresponding one of the female terminals, adds up, so that a variation in the entire insertion load of the male terminals becomes large. In such a case, even when the connection state of one or more of the male terminals is unacceptable, the measurement value of the insertion load of the one or more male terminals is hidden in the variation in the entire insertion load of the male terminals. Thereby, in such a case, it is not possible to check whether all of the male terminals are press fitted into the female terminals in a normal way.

Particularly, in a case of a drive apparatus (an actuator), in which an electric motor and a controller are assembled together, motor lines, which extend from the electric motor, are press fitted into connection terminals provided to a circuit board of the controller. At this time, the connection terminals are covered with a cover of the controller in many cases. Thereby, in such a case, the connection state of the motor lines cannot be visually checked. Thus, it is important to enable accurate check of whether all of the motor lines are press fitted into the connection terminals in a normal way through measurement of the insertion load.

SUMMARY

The present disclosure is made in view of the above disadvantages. According to the present disclosure, there is provided a drive apparatus that includes a controller, and an electric motor. The controller includes a circuit board, which has at least one electronic component mounted to the circuit board, and a plurality of connection terminals, which are provided to the circuit board. The electric motor receives an electric power from the controller and includes a plurality of winding sets and a plurality of motor lines. The winding sets form a plurality of systems, respectively. Each of the plurality of winding sets includes a plurality of windings. Each of the motor lines extends from a corresponding one of the plurality of windings of a corresponding one of the plurality of winding sets in a common direction toward the circuit board and is press fitted into a corresponding one of the plurality of connection terminals. Each of the plurality of motor lines has an insertion length that is a length of the motor line measured from a contact start part of the motor line, which first contacts the corresponding one of the plurality of connection terminals at a time of press fitting the motor line into the corresponding one of the plurality of connection terminals, to a contacting part of the motor line, which is in contact with the corresponding one of the plurality of connection terminals after the press fitting of the motor line into the corresponding one of the plurality of connection terminals. The insertion lengths of the plurality of motor lines are grouped into at least two groups.

BRIEF DESCRIPTION OF THE DRAWINGS

The drawings described herein are for illustration purposes only and are not intended to limit the scope of the present disclosure in any way.

DETAILED DESCRIPTION

A drive apparatus of an embodiment of the present disclosure will be described with reference to the accompanying drawings. The drive apparatus of the present embodiment is applied to, for example, an electric power steering system, which assists a steering operation of a driver of a vehicle and outputs a steering assist torque.

Figure 1:
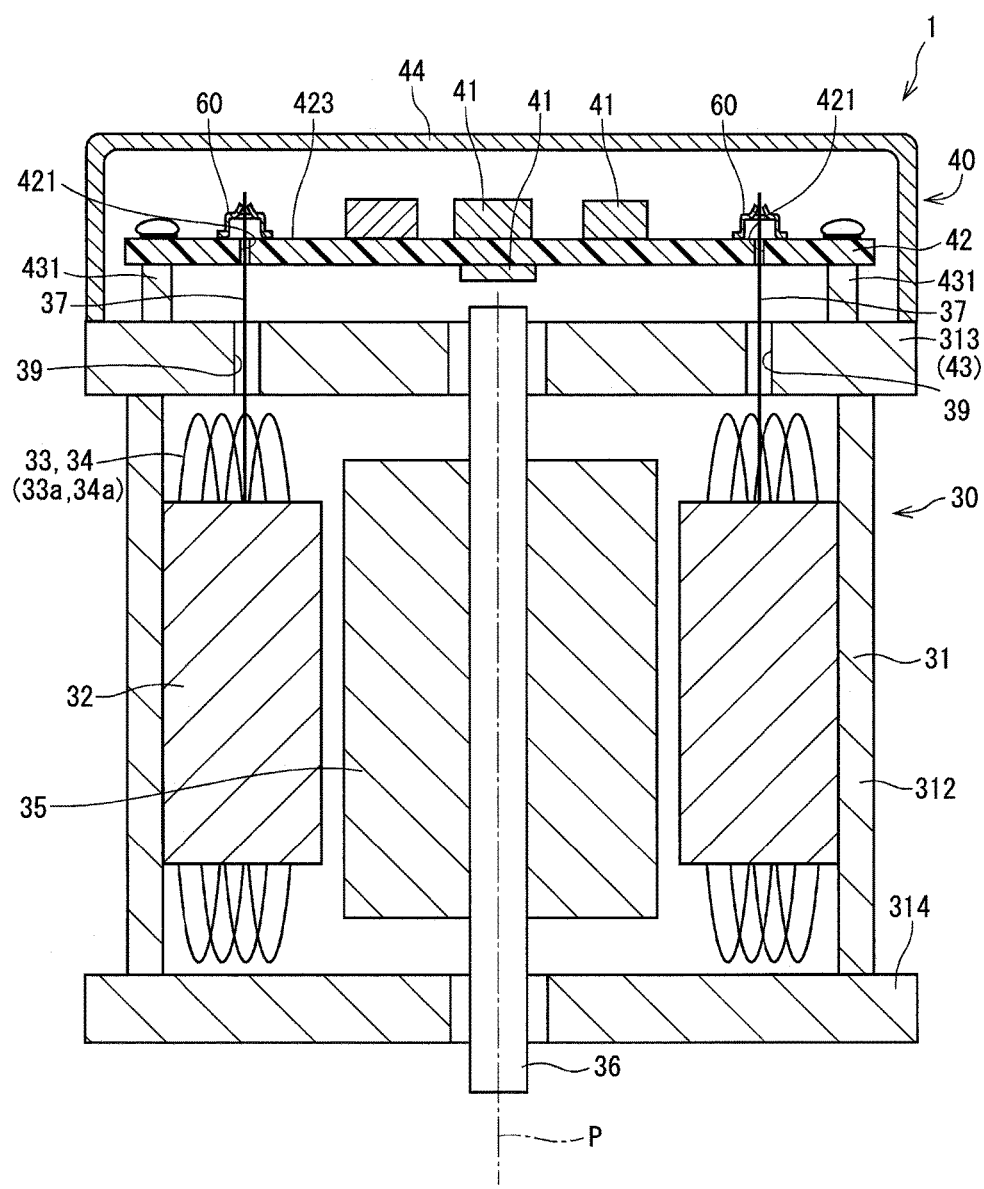
FIG. 1 is a cross-sectional view of a drive apparatus according to an embodiment of the present disclosure.

An entire structure of the drive apparatus 1 will be described with reference to FIG. 1.

The drive apparatus 1 includes an electric motor 30, and a controller 40. The controller 40 controls energization of the electric motor 30. The controller 40 is placed on one axial side of the electric motor 30, and the electric motor 30 and the controller 40 are integrated together.

The electric motor 30 is for example a three-phase AC motor and includes a motor case 31, a stator 32, two winding sets (first and second winding sets) 33, 34, a rotor 35, and a shaft 36. The two winding sets 33, 34 form two systems (two drive systems), respectively.

The motor case 31 is made of metal (e.g., aluminum) and is configured into a cup form. The motor case 31 receives the stator 32 in an inside of the motor case 31. The motor case 31 includes a tubular portion 312, and two frames 313, 314. The frames 313, 314 are placed at two opposite openings, respectively, of the tubular portion 312.

The stator 32 is fixed to the inside of the motor case 31, and the two winding sets 33, 34 are wound around the stator 32. Each of the two winding sets 33, 34 includes three phase windings 33a, 34a (a U-phase winding, a V-phase winding, and a W-phase winding in this instance). Each of a plurality of motor lines 37 extends from a corresponding one of the windings 33a, 34a of the winding sets 33, 34. Each of the motor lines 37 is pulled to the controller 40 side through a corresponding one of motor line receiving holes 39 of the motor case 31.

The rotor 35 is placed on a radially inner side of the stator 32 such that the rotor 35 is coaxial with the stator 32. The shaft 36 is fixed to a center of the rotor 35 and is rotatably supported by bearings (not shown), which are installed to the motor case 31.

The controller 40 includes a circuit board 42, a frame 43 and a cover 44. Various electronic components (a plurality of electronic components) 41 are mounted to the circuit board 42. In the present embodiment, the frame 43 also serves as the frame 313 of the motor case 31. Hereinafter, the frame 43 is described as the constituent component of the controller 40.

In the present embodiment, the electronic components 41 are mounted to the circuit board (the single circuit board) 42. Thereby, in comparison to a case where the controller 40 includes a plurality of circuit boards, according to the present embodiment, the number of the components of the drive apparatus 1 can be reduced, and a size of the drive apparatus 1 can be reduced.

The circuit board 42 is arranged such that a plane of the circuit board 42 is perpendicular to a rotational axis P of the electric motor 30 (i.e., a rotational axis P of the shaft 36 of the electric motor 30). The circuit board 42 includes a plurality of motor line receiving holes 421, through which the motor lines 37 are respectively inserted. A plurality of connection terminals 60, which correspond to the motor lines 37, respectively, is provided to a surface 423 of the circuit board 42, which is opposite from the electric motor 30. Each connection terminal 60 resiliently contacts the corresponding motor line 37, as described later. Each motor line 37 is connected to the circuit board 42 through the corresponding connection terminal 60 by press fitting the motor line 37 into the connection terminal 60.

The frame 43 is placed between the electric motor 30 and the circuit board 42 in the axial direction of the rotational axis P. The frame 43 includes the motor line receiving holes 39 described above and a plurality of circuit board support portions 431, which support the circuit board 42.

The cover 44 covers an upper part of the circuit board 42 and is fixed to the frame 43 with, for example, a bonding agent.

The drive apparatus 1 is formed by assembling the electric motor 30 and the controller 40 together. At this time, each of the motor lines 37 is inserted through the corresponding motor line receiving hole 39 of the frame 43 and the corresponding motor line receiving hole 421 of the circuit board 42 and is press fitted into the corresponding connection terminal 60.

A basic structure of the motor lines 37 and the connection terminals 60 will be described with reference to FIGS. 2 and 3. In FIG. 3, only one of the connection terminals 60 is indicated with reference signs of constituent parts of the connection terminal 60 described hereinafter for the sake of simplicity. Furthermore, in FIG. 3, the electronic components 41 of the circuit board 42 are not depicted for the sake of simplicity.

Figure 2:
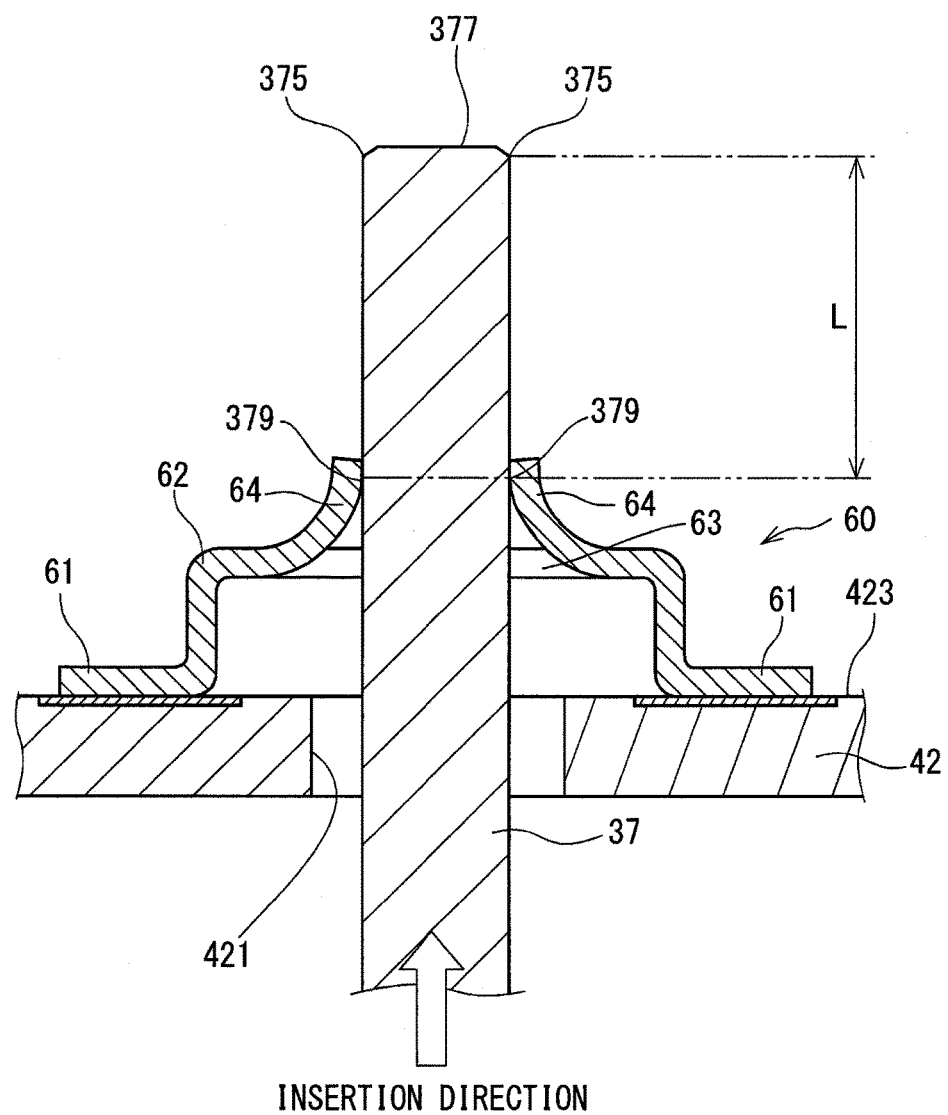
FIG. 2 is an enlarged cross sectional view showing a motor line and a connection terminal according to the embodiment.
Figure 3:
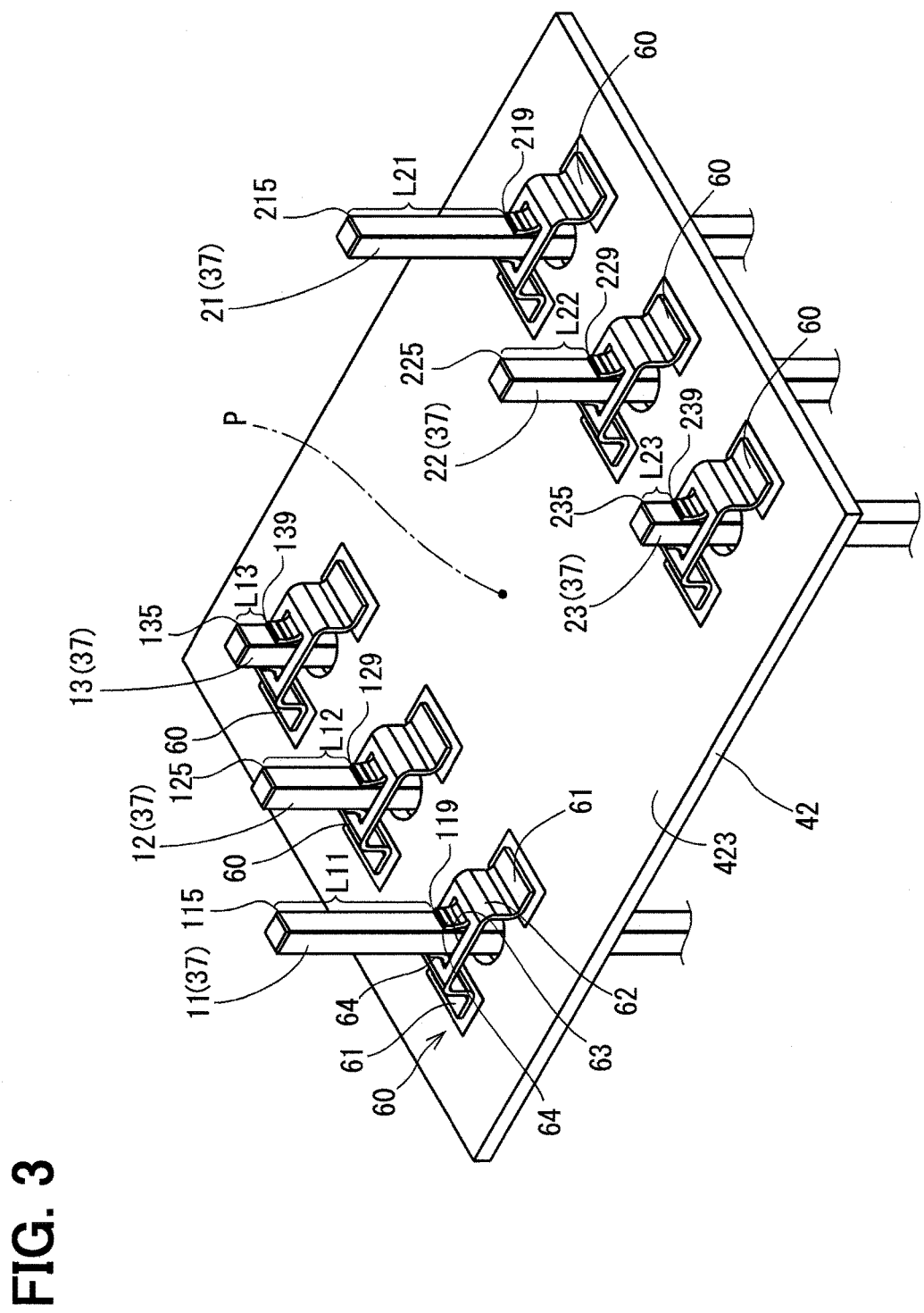
FIG. 3 is a perspective view showing motor lines and corresponding connection terminals according to the embodiment.

As shown in FIGS. 2 and 3, each connection terminal 60 is a metal piece, which is mounted to the surface 423 of the circuit board 42 and includes a pair of fixing portions (two fixing portions) 61, a protrusion 62 and a pair of resilient portions (two resilient portions) 64.

The fixing portions 61 are fixed to an electric conductive line exposed at the circuit board 42 by, for example, soldering. The protrusion 62 is configured generally into a U-shape and forms a space between the protrusion 62 and the circuit board 42 at a location between the fixing portions 61. A receiving hole 63 is formed in the protrusion 62.

The resilient portions 64 are opposed to each other and obliquely extend from the protrusion 62 toward an opposite side that is opposite from the circuit board 42.

As shown in FIG. 3, the motor lines 37 extend from the windings 33a, 34a of the winding sets 33, 34 in a common direction (a direction parallel to the rotational axis P) toward the circuit board 42. Each motor line 37 is received through the receiving hole 63 of the corresponding connection terminal 60 and is press fitted between the resilient portions 64 of the corresponding connection terminal 60.

Furthermore, as shown in FIG. 2, the motor line 37 is press fitted to the connection terminal 60 such that at least an end part 377 of the motor line 37 projects to an opposite side of the connection terminal 60, which is opposite from the circuit board 42. Hereinafter, a direction of press fitting the motor line 37 into the connection terminal 60 will be simply referred to as an insertion direction.

A part of the motor line 37, which first contacts the corresponding connection terminal 60 at the time of press fitting the motor line 37 into the corresponding connection terminal 60, will be hereinafter referred to as a contact start part 375 of the motor line 37. The contact start part 375 of the present embodiment is a part of the outer peripheral surface of the motor line 37, which is closest to the end part 377 in the outer peripheral surface of the motor line 37. During the process of the press fitting, the motor line 37 is moved relative to the connection terminal 60 in the insertion direction while the motor line 37 slides along the resilient portions 64. A part of the motor line 37, which is in contact with the corresponding connection terminal 60 after the press-fitting of the motor line 37 into the connection terminal 60, will be hereinafter referred to as a contacting part 379 of the motor line 37. Here, a length of the motor line 37, which is measured from the contacting part 379 to the contact start part 375, will be hereinafter referred to as an insertion length L.

Next, differences in the insertion length L of the motor line 37 will be described with reference to FIG. 3.

In the following discussion, three of the motor lines 37, which extend from the windings 33a of the first winding set 33, will be referred to as motor lines 11-13 of the first system, and the other three of the motor lines 37, which extend from the windings 34a of the second winding set 34, will be referred to as motor lines 21-23 of the second system. For example, the motor lines 11-13 extend form the U-phase winding, the V-phase winding, and the W-phase winding, respectively, of the first winding set 33, and the motor lines 21-23 extend from the U-phase winding, the V-phase winding, and the W-phase winding, respectively, of the second winding set 34.

As shown in FIG. 3, a length of the motor line 11, a length of the motor line 12, and a length of the motor line 13 decrease in this order. Here, the lengths of the motor lines 11-13 refer to lengths of the motor lines 11-13, which extend from the windings 33a, respectively, of the winding set 33 of the electric motor 30 in a common direction on the circuit board 42 side.

Therefore, a location of the contacting part 119 of the motor line 11 in the insertion direction, a location of the contacting part 129 of the motor line 12 in the insertion direction, and a location of the contacting part 139 of the motor line 13 in the insertion direction are equal to each other. In contrast, a distance of the contact start part 115 of the motor line 11 measured from the contacting part 119 in the insertion direction, a distance of the contact start part 125 of the motor line 12 measured from the contacting part 129 in the insertion direction, and a distance of the contact start part 135 of the motor line 13 measured from the contacting part 139 in the insertion direction decrease in this order. Here, the insertion length L of the motor line 11 will be referred to as an insertion length L11. The insertion length L of the motor line 12 will be referred to as an insertion length L12. Furthermore, the insertion length L of the motor line 13 will be referred to as an insertion length L13. In such a case, a relationship of L11>L12>L13 is satisfied.

Similarly, a length of the motor line 21, a length of the motor line 22, and a length of the motor line 23 decrease in this order. Therefore, a location of the contacting part 219 of the motor line 21 in the insertion direction, a location of the contacting part 229 of the motor line 22 in the insertion direction, and a location of the contacting part 239 of the motor line 23 in the insertion direction are equal to each other. In contrast, a distance of the contact start part 215 of the motor line 21 measured from the contacting part 219 in the insertion direction, a distance of the contact start part 225 of the motor line 22 measured from the contacting part 229 in the insertion direction, and a distance of the contact start part 235 of the motor line 23 measured from the contacting part 239 in the insertion direction decrease in this order. Here, the insertion length L of the motor line 21 will be referred to as an insertion length L21. The insertion length L of the motor line 22 will be referred to as an insertion length L22. Furthermore, the insertion length L of the motor line 23 will be referred to as an insertion length L23. In such a case, a relationship of L21>L22>L23 is satisfied.

The distribution of the insertion lengths L11-L13 of the motor lines 11-13 in the first system is rotational symmetric about the rotational axis P relative to the distribution of the insertion lengths L21-L23 of the motor lines 21-23 in the second system. Specifically, there is satisfied the relationship of L11=L21, L12=L22, and L13=L23. The insertion length L11 of the motor line 11 and the insertion length L21 of the motor line 21 will be collectively referred to as a first group. The insertion length L12 of the motor line 12 and the insertion length L22 of the motor line 22 will be collectively referred to as a second group. The insertion length L13 of the motor line 13 and the insertion length L23 of the motor line 23 will be collectively referred to as a third group.

Next, the press-fitting of the motor lines 11-13, 21-23 into the connection terminals 60 will be described with reference to FIGS. 4A to 4D. In the following discussion, although the motor lines 11-13 of the first system will be described, the discussion of the motor lines 11-13 of the first system is equally applicable to the motor lines 21-23 of the second system. In FIGS. 4A to 4D, for the purpose of easy understanding of the press fitting of the motor lines 11-13, each of the three connection terminals 60 is rotated by 90 degrees about a center axis of the motor line 11-13 from the state shown in FIG. 3.

When the electric motor 30 is moved toward the controller 40 in the axial direction of the rotational axis P, the motor lines 11-13 are moved toward the corresponding connection terminals 60, respectively.

Figure 4A:
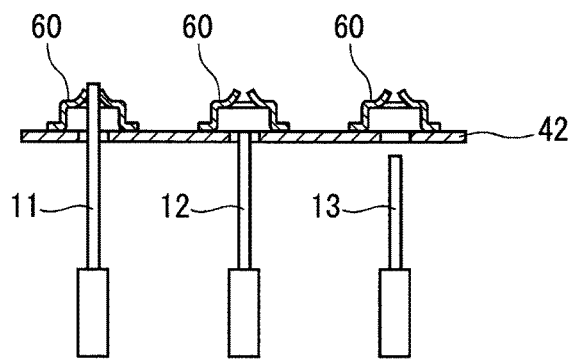
FIGS. 4A to 4D are schematic diagrams for describing a process of press fitting motor lines of a first system into corresponding connection terminals according to the embodiment.

In this way, as shown in FIG. 4A, the motor line 11 first begins to contact the corresponding connection terminal 60 among the three motor lines 11-13. At this time, the motor lines 12, 13 do not contact the corresponding connection terminals 60. A stage, in which only the motor line 11 among the motor lines 11-13 contacts the corresponding connection terminal 60, will be referred to as a first press fitting stage.

Figure 4B:
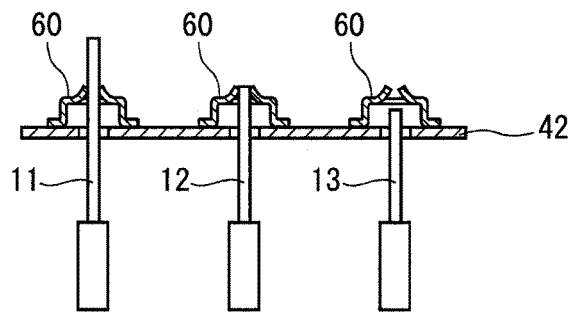

Next, as shown in FIG. 4B, the motor line 12 begins to contact the corresponding connection terminal 60. At this time, the motor line 11 is kept in contact with the connection terminal 60, and the motor line 13 has not yet contacted the corresponding connection terminal 60. A stage, in which only the motor lines 11, 12 among the motor lines 11-13 contact the corresponding connection terminals 60, respectively, will be referred to as a second press fitting stage.

Figure 4C:
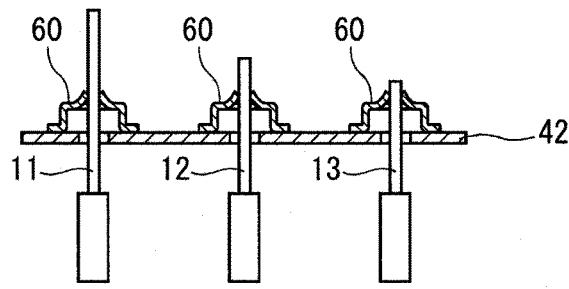
Figure 4D:
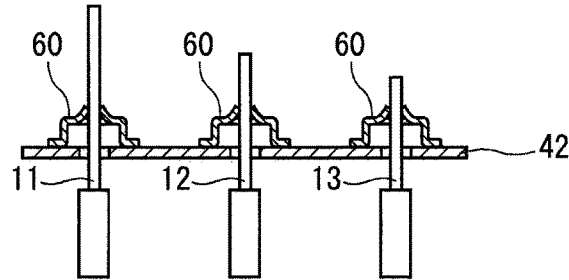

Next, as shown in FIG. 4C, the motor line 13 begins to contact the corresponding connection terminal 60. In this way, all of the motor lines 11-13 contact the corresponding connection terminals 60, respectively. This stage will be referred to as a third press fitting stage. Thereafter, as shown in FIG. 4D, all of the motor lines 11-13 are sufficiently press fitted into the corresponding connection terminals 60, respectively.

As discussed above, the motor lines 11-13 sequentially begin to contact the corresponding connection terminals 60 in a decreasing order of the insertion lengths L11-L13 of the motor lines 11-13.

When the first system and the second system are considered together, the motor lines 11, 21 of the first group first begin to contact the corresponding connection terminals 60, respectively. Then, the motor lines 12, 22 of the second group begin to contact the corresponding connection terminals 60, respectively. Finally, the motor lines 13, 23 of the third group begin to contact the corresponding connection terminals 60, respectively.

Once each of the motor lines 11-13, 21-23 begins to contact the corresponding connection terminal 60, a constant contact pressure is kept applied from the connection terminal 60 to the motor line 11-13, 21-23.

Now, an insertion load of the motor lines 11-13, 21-23 will be described.

At the time of manufacturing the drive apparatus 1, the insertion load is applied to press fit the motor lines 11-13, 21-23 into the corresponding connection terminals 60, respectively. A connection state of the motor lines 11-13, 21-23 can be checked by measuring this insertion load.

For example, in a case of an insertion failure state (an unacceptable connection state) of the motor line where the motor line is not inserted into the connection terminal and extends in an unexpected direction, the measured insertion load is reduced from an ideal value thereof. Furthermore, in a case of a bent state of the motor line where the motor line is not inserted into the connection terminal and is urged against the connection terminal in a bent state, the measured insertion load is increased from the ideal value thereof.

The insertion load applied to the respective motor lines 11-13, 21-23 may vary due to various factors, such as manufacturing errors. Therefore, a normal range, which serves as a reference for determining whether the measured value is normal, is set to include dispersions (deviations) from the ideal value.

Figure 6:
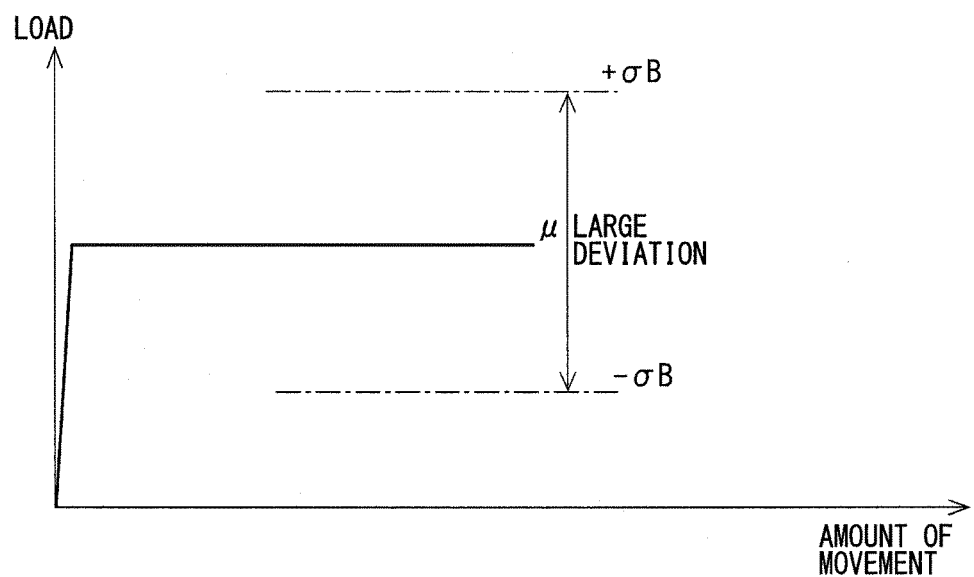
FIG. 6 is a diagram indicating an ideal value of an insertion load of motor lines relative to the amount of movement of the motor lines in a previously proposed drive apparatus.

FIG. 6 indicates an ideal value p of the insertion load to be measured at the time of manufacturing a previously proposed drive apparatus, which serves as a comparative example. In the previously proposed drive apparatus, the insertion lengths L of all of the motor lines are equal to each other, so that the insertion load, which is applied to simultaneously press fit all of the motor lines, is measured. Therefore, as shown in FIG. 6, a deviation σB (see +σB and −σB in FIG. 6) relative to the ideal value p becomes large. Therefore, even when a connection state of one or more of the motor lines is unacceptable, the measured value of the insertion load may possibly fall in the normal range. Thus, in such a case, the connection states of all of the motor lines cannot be correctly checked.

In contrast, according to the present embodiment, the insertion lengths L11-L13, L21-L23 of the motor lines 11-13, 21-23 are grouped into the three groups, so that the insertion load is measured on a group-by-group basis sequentially in the decreasing order of the lengths L11-L13, L21-L23 of the motor lines 11-13, 21-23. The measured insertion load is increased in a stepwise manner according to the number of the motor lines 11-13, 21-23, which have started the contacting with the corresponding connection terminals 60, respectively.

Figure 5:
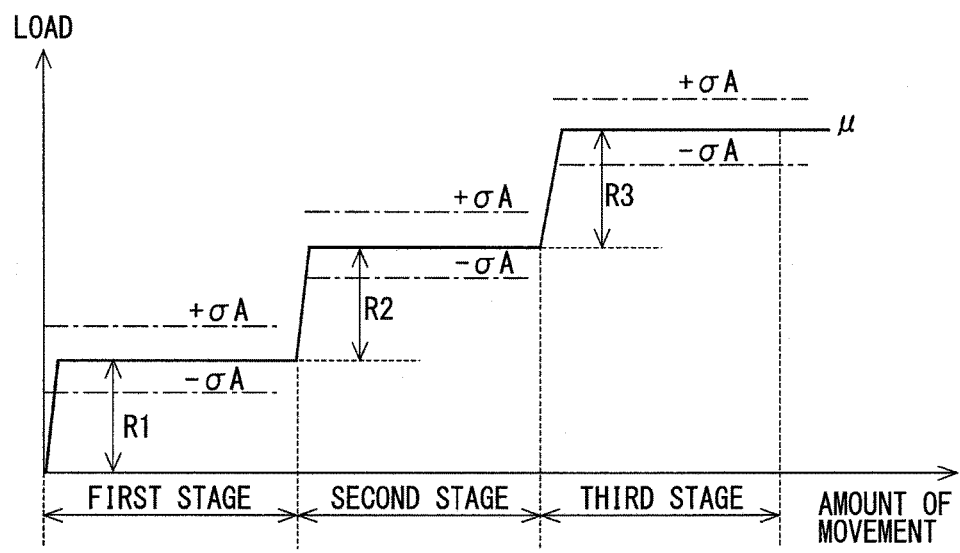
FIG. 5 is a diagram indicating an ideal value of an insertion load of motor lines relative to the amount of movement of the motor lines in the drive apparatus of FIG. 1.

FIG. 5 indicates the ideal value μ of the insertion load of the motor lines 11-13, 21-23 relative to the amount of movement (relative movement) of the motor lines 11-13, 21-23. Here, the amount of change in the insertion load of the motor lines 11-13, 21-23, which changes at each of the first to third press fitting stages (also referred to as first to third stages), will be referred to as a load change amount R1-R3. Each of the load change amounts R1-R3 shown in FIG. 5 corresponds to the insertion load applied to the motor lines 11-13, 21-23 at the time of starting the contact of the corresponding two of the motor lines 11-13, 21-23 with the corresponding connection terminals 60 at the corresponding one of the first to third press fitting stages, which are indicated as the first to third stages, respectively, in FIG. 5. That is, each of the load change amounts R1-R3 shown in FIG. 5 corresponds to the ideal value of the insertion load applied to the corresponding two of the motor lines 11-13, 21-23, each of which is taken from the corresponding one of the first and second systems, at the corresponding one of the first to third press fitting stages.

Thereby, in the present embodiment, the connection state of the motor lines 11-13, 21-23 can be checked by measuring each of the load change amounts R1-R3 at the corresponding one of the first to third press fitting stages. For example, in a case where one of the load change amounts R1-R3 is abnormal, it is understood that the connection state of the corresponding two of the motor lines 11-13, 21-23 shows the abnormality at the corresponding one of the first to third press fitting stages, at which the load change amount R1-R3 is found to be abnormal.

Furthermore, in the present embodiment, the motor lines 11-13, 21-23 are sequentially press fitted into the corresponding connection terminals 60 on the group-by-group basis (i.e., the motor lines 11, 21 of the first group, the motor lines 12, 22 of the second group, and the motor lines 13, 23 of the third group in this order). Therefore, in the present embodiment, a deviation σA (see +σA and −σA in FIG. 6) relative to each of the load change amounts R1-R3 is reduced in comparison to the deviation σB of the previously proposed technique.

Now, advantages of the present embodiment will be described.

(1) The drive apparatus 1 of the present embodiment includes the controller 40 and the electric motor 30. The controller 40 includes the circuit board 42, which has the electronic components 41 mounted to the circuit board 42, and the connection terminals 60, which are provided to the circuit board 42. The electric motor 30 receives an electric power from the controller 40. The electric motor 30 includes the two winding sets (the first and second winding sets) 33, 34 and the motor lines 11-13, 21-23. The two winding sets 33, 34 form the two systems, respectively. Each of the winding sets 33, 34 includes the windings 33a, 34a. Each of the motor lines 11-13, 21-23 extends from the corresponding one of the windings 33a, 34a of the corresponding one of the winding sets 33, 34 in a common direction toward the circuit board 42 and is press fitted into the corresponding one of the connection terminals 60. The insertion lengths L11-L13, L21-L23 of the motor lines 11-13, 21-23 are grouped into at least the two groups (the first to third groups in this embodiment).

As discussed above, the drive apparatus 1 of the present embodiment enables the check of the connection state of the motor lines 11-13, 21-23 by measuring the load change amount, which is the amount of change in the insertion load of the motor lines 11-13, 21-23, at the time of press fitting the motor lines 11-13, 21-23 into the corresponding connection terminals 60.

Furthermore, the motor lines 11-13, 21-23 are grouped into at least the two groups and are sequentially press fitted into the connection terminals 60 on the group-by-group basis. Therefore, the deviation of the measurement value is reduced in comparison to the previously proposed technique where all of the motor lines are simultaneously inserted into the connection terminals. Therefore, it is possible to limit occurrence of the undetected state of the measurement value that is measured in the case where the connection state of one or more of the motor lines 11-13, 21-23 is bad (i.e., unacceptable).

Thus, it is possible to accurately check whether all of the motor lines 11-13, 21-23 are press fitted into the connection terminals 60 in a normal way through the measurement of the insertion load.

Particularly, in the drive apparatus 1 of the present embodiment, the connection terminals 60 are covered with the cover 44 of the controller 40, and thereby the connection state of the motor lines 11-13, 21-23 cannot be visually checked. Even in this structure, it is advantageous that the connection state of the motor lines 11-13, 21-23 can be correctly checked.

(2) In the present embodiment, the insertion lengths L11-L13, L21-L23 of the motor lines 21-23 are different from each other in each of the first and second systems. In this way, the deviation σA of the load change amount to be measured becomes small, so that the connection state of the motor lines 11-13, 21-23 can be more accurately checked.

(3) In the present embodiment, the distribution of the insertion lengths L11-L13 (or the distribution of the differences in the insertion lengths L11-L13) in the first system is rotationally symmetric about the rotational axis P of the electric motor 30 relative to the distribution of the insertion lengths L21-L23 (or the distribution of the differences in the insertion lengths L21-L23) in the second system. Thereby, the insertion load of the corresponding ones of the motor lines 11-13, 21-23 is balanced at the time of inserting the corresponding ones of the motor lines 11-13, 21-23 into the corresponding connection terminals 60, and thereby the corresponding ones of the motor lines 11-13, 21-23 can be stably press fitted into the corresponding connection terminals 60, (4) In the present embodiment, the connection terminals 60 are formed in the common surface 423 of the circuit board 42, and the lengths of the motor line 11-13, 21-23 are different from each other in each of the two systems. In this way, it is easy to implement the structure for press fitting the motor lines 11-13, 21-23 while grouping the motor lines 11-13, 21-23 into at least the two groups.

Now, modifications of the embodiment will be described.

(A) The electric motor of the present disclosure is not limited to the three-phase AC motor. For example, the electric motor of the present disclosure may be a brushed DC motor. Furthermore, the present disclosure is not limited to the three-phase AC motor and may be applied to another type of multiphase electric motor, which has four or more phases. The number of winding sets is not limited to two and may be three or more to form three or more systems.

(B) The drive apparatus of the present disclosure is not limited to the electromechanical drive apparatus, which includes both of the electric motor 30 and the controller 40 that are integrated together. That is, as long as the motor lines are connected to the circuit board, the electric motor and the controller may be separately provided.

(C) The lengths L of the motor lines of the present disclosure are not limited to the ones described in the above embodiment. That is, it is only required that the lengths of the motor lines are grouped into at least the two groups.

Furthermore, in the above embodiment, the lengths of the motor lines are different from each other in each of the systems. Alternatively, the lengths of the motor lines may be equal to each other in each of the systems. For example, the insertion lengths L of the motor lines may be equal to each other in each of the first and second systems, and the insertion lengths L of the motor lines of the first system may be different from the insertion lengths L of the motor lines of the second system. Furthermore, the distribution of the insertion lengths of the motor lines (or the distribution of the differences in the insertion lengths of the motor lines) in one of the systems is not necessarily rotationally symmetric relative to the distribution of the insertion lengths of the motor lines (or the distribution of the differences in the insertion lengths of the motor lines) in another one of the systems. The distributions of the insertion lengths of the motor lines (or the distributions of the differences in the insertion lengths of the motor lines) may be random.

Figure 7:
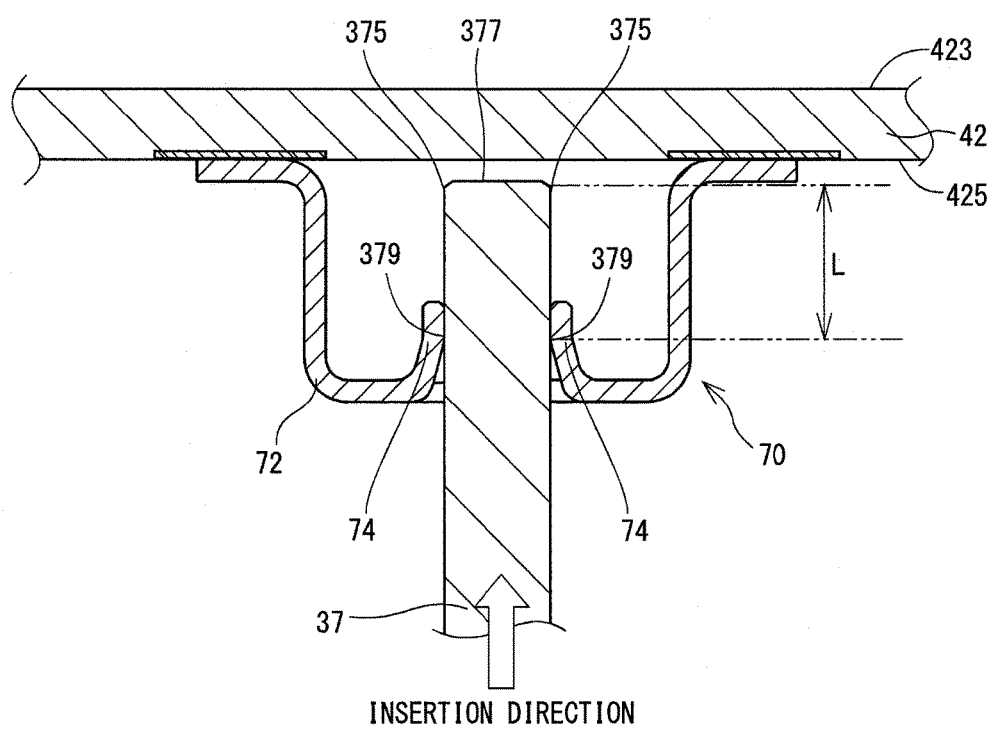
FIG. 7 is an enlarged cross sectional view showing a motor line and a connection terminal in a modification of the embodiment.

(D) In the above embodiment, the connection terminals 60 are provided to the surface 423 of the circuit board 42, which is opposite from the electric motor 30 in the axial direction of the rotational axis P. However, the present disclosure is not limited to this arrangement. For example, as shown in FIG. 7, connection terminals 70 may be provided to a surface 425 of the circuit board 42, which is located on the side of the circuit board 42 where the electric motor 30 is placed. In such a case, a pair of resilient portions (two resilient portions) 74 of each connection terminal 70 may extent toward the inside of a protrusion 72.

Furthermore, the structure of each connection terminal is not limited to the above-described one. That is, as long as the motor line can be inserted into the connection terminal, the connection terminal may have any other suitable structure.

(E) In the above embodiment, the insertion lengths L11-L13, L21-L23 of the motor lines 11-13, 21-23 vary depending on the relationship between the connection terminals 60 provided to the common surface 423 of the circuit board 42 and the motor lines 11-13, 21-23 having the different lengths. However, the present disclosure is not limited to this. For example, in place of the single circuit board, two circuit boards may be used to change the locations of the connection terminals in the insertion direction, and the lengths of the motor lines 11, 13, 21, 23, which extend from the electric motor 30, may be lengthened. Furthermore, a width (or a diameter) of each corresponding motor line 11-13, 21-23, which is measured in a direction perpendicular to the longitudinal direction of the motor line 11-13, 21-23, may be changed along the length of the motor line 11-13, 21-23 in the insertion direction to adjust the location of the contact start part of the motor line 11-13, 21-23, which first contacts the corresponding connection terminal 60.

As discussed above, the present disclosure is not limited to the above embodiments and the modifications thereof. That is, the above embodiments and modifications thereof may be further modified in various ways without departing from the principle of the present disclosure.

What is claimed is:

1. A drive apparatus comprising:
   a controller that includes:
      a circuit board, which has at least one electronic component mounted to the circuit board; and
      a plurality of connection terminals, which are provided to the circuit board; and
   an electric motor that receives an electric power from the controller and includes:
      a plurality of winding sets, which form a plurality of systems, respectively, wherein each of the plurality of winding sets includes a plurality of windings; and
      a plurality of motor lines, each of which extends from a corresponding one of the plurality of windings of a corresponding one of the plurality of winding sets in a common direction toward the circuit board and is press fitted into a corresponding one of the plurality of connection terminals, wherein:
   each of the plurality of motor lines has an insertion length that is a length of the motor line measured from a contact start part of the motor line, which first contacts the corresponding one of the plurality of connection terminals at a time of press fitting the motor line into the corresponding one of the plurality of connection terminals, to a contacting part of the motor line, which is in contact with the corresponding one of the plurality of connection terminals after the press fitting of the motor line into the corresponding one of the plurality of connection terminals; and
   the insertion lengths of the plurality of motor lines are grouped into at least two groups.

2. The drive apparatus according to claim 1, wherein in each of the plurality of winding sets, corresponding ones of the plurality of motor lines extend from the plurality of windings, respectively, of the winding set, and the insertion lengths of the corresponding ones of the plurality of motor lines differ from each other.

3. The drive apparatus according to claim 2, wherein a distribution of the insertion lengths of the corresponding ones of the plurality of motor lines in one of the plurality of systems is rotationally symmetric about a rotational axis of the electric motor relative to a distribution of the insertion lengths of the corresponding ones of the plurality of motor lines in another one of the plurality of systems.

4. The drive apparatus according to claim 1, wherein:
   the plurality of winding sets includes two winding sets; and
   the plurality of systems includes two systems.

5. The drive apparatus according to claim 1, wherein:
   the plurality of connection terminals is all provided to a common surface of the circuit board; and
   in each of the plurality of winding sets, corresponding ones of the plurality of motor lines extend from the plurality of windings, respectively, of the winding set, and lengths of the corresponding ones of the plurality of motor lines, which are measured from the plurality of windings, respectively, of the winding set, differ from each other.

* * * * *